(12) United States Patent
Kumagai et al.

(10) Patent No.: US 6,453,569 B1
(45) Date of Patent: Sep. 24, 2002

(54) SURVEYING INSTRUMENT AND PLUMBING DEVICE FOR PLUMBING SURVEYING INSTRUMENT

(75) Inventors: Kaoru Kumagai; Fumio Ohtomo, both of Tokyo (JP)

(73) Assignee: Kabushiki Kaisha Topcon (JP)

(*) Notice: Subject to any disclaimer, the term of this patent is extended or adjusted under 35 U.S.C. 154(b) by 0 days.

(21) Appl. No.: 09/348,211

(22) Filed: Jul. 8, 1999

(30) Foreign Application Priority Data

Jul. 8, 1998 (JP) .......................................... 10-208689

(51) Int. Cl.[7] .............................. G01C 1/00; G01C 15/00
(52) U.S. Cl. .............................. 33/281; 33/284; 33/286; 33/290; 356/3
(58) Field of Search .......................... 33/290, 292, 281, 33/282, 284, 285, 286; 356/148, 247, 248, 3, 3.01, 3.02

(56) References Cited

U.S. PATENT DOCUMENTS

| 4,171,907 A | * | 10/1979 | Hill et al. ....................... 356/5 |
| 4,621,433 A | * | 11/1986 | Takeuchi et al. .............. 33/290 |
| 4,907,882 A | * | 3/1990 | Waibel et al. ............... 356/248 |
| 5,313,409 A | * | 5/1994 | Wiklund et al. .............. 33/290 |
| 5,392,521 A | * | 2/1995 | Allen ........................... 33/293 |
| 5,485,266 A | * | 1/1996 | Hirano et al. ................. 33/281 |
| 5,867,263 A | * | 2/1999 | Ohtomo et al. ............. 356/248 |
| 5,949,548 A | * | 9/1999 | Shirai et al. .................. 33/292 |
| 5,983,511 A | * | 11/1999 | Osaragi et al. ............... 33/290 |
| 6,044,567 A | * | 4/2000 | Feist ........................... 33/292 |
| 6,046,800 A | * | 4/2000 | Ohtomo et al. .......... 356/141.1 |

FOREIGN PATENT DOCUMENTS

EP 000488046 * 6/1992 ................. 33/290

* cited by examiner

Primary Examiner—Diego Gutierrez
Assistant Examiner—Yaritza Guadalupe
(74) Attorney, Agent, or Firm—Baker Botts LLP

(57) ABSTRACT

Disclosed is a surveying instrument and a plumbing device for plumbing the surveying instrument. The plumbing device is capable of calculating dislocations x and y of the surveying instrument from a datum point, and the instrument height H of the surveying instrument. The plumbing device comprises optical means for forming an image of a target placed at a survey station to indicate the survey station, photoelectric means for receiving an image of the target and providing an image signal, and processing means for calculating instrument height corresponding to distance between a reference point on the surveying instrument and the target, and dislocations of the reference point from the survey station.

6 Claims, 7 Drawing Sheets

SURVEYING INSTRUMENT AND PLUMBING DEVICE FOR PLUMBING SURVEYING INSTRUMENT

BACKGROUND OF THE INVENTION

The present invention relates to a plumbing device for plumbing a surveying instrument and, more particularly, to a plumbing device for plumbing a surveying instrument, capable of calculating dislocations x and y of the surveying instrument from a datum point, and the instrument height H of the surveying instrument.

Generally, survey work is carried out with reference to a datum point. A survey instrument is set on a datum point or a given point and measurement is made from the datum point or the given point. For example, a theodolite has a sighting telescope mounted so that it is free to rotate around horizontal and vertical axes, and the sight directions of the sighting telescope are measured for survey. A leveling instrument is used for measuring the difference of height of a sight position.

These survey instruments are used on a tripod. Therefore, the height of the sighting telescope from the ground, i.e., instrument height necessary for calculating difference of elevation, must be measured.

FIG. 9 shows a surveying instrument 9100 mounted on a tripod 9000, and a surveying marker 9200. The surveying instrument 9100 is set so that its vertical rotation axis coincides with a vertical line passing a datum point. A reference point for measuring instrument height H is formed on a support coinciding with the center of horizontal rotation of a sighting telescope.

As shown in FIG. 10, the surveying instrument 9100 is provided with a leveling mechanism 9110 for aligning the tilted vertical rotation axis thereof with the vertical line, and a plumbing telescope 9120 for correcting the horizontal position thereof. A datum point lying under the surveying instrument 9100 on the vertical rotation axis can be viewed through a reflecting prism 9130 and the plumbing telescope 9120.

A surveyor installs the surveying instrument 9100 in alignment with the datum point, measures the instrument height H of the surveying instrument 9100, and measures the distance between the reference point on the support of the surveying instrument 9100 and the surveying marker 9200 with a measuring tape or the like.

When measuring the instrument height H of the conventional surveying instrument 9100, the distance between the point on a lower part of the surveying instrument 9100 and the surveying marker 9200, and the thickness of a mount and the height of the surveying instrument 9100 are added to the distance. Since the height of the surveying instrument 9100 is changed by leveling, the height of the surveying instrument 9100 needs to be measured when installing the surveying instrument 9100, which takes time and accurate measurement cannot be expected.

Usually, the distance between the reference point and the surveying marker 9200 is measured approximately and directly. In some cases, the reference point for measuring the instrument height H does not lie on the vertical line passing the datum point, and hence the accurate measurement of the instrument height H is impossible.

The surveying instrument 9100 must be set with its vertical rotation axis aligned with the vertical line passing the datum point to achieve accurate surveying and the accurate measurement of the instrument height H.

First the position of the surveying instrument 9100 mounted on the tripod 9000 is adjusted by the leveling mechanism 9110 so that the vertical rotation axis of the surveying instrument 9100 extend vertically. Subsequently, a screw, not shown, fastening the surveying instrument 9100 to the tripod 9000 is unfastened slightly while viewing the plumbing telescope 9120, and the surveying instrument 9100 is moved horizontally to bring the vertical rotation axis of the surveying instrument 9100 into alignment with the vertical line passing the datum point.

This adjustment work requires very high skill. An error is introduced into the level of the surveying instrument 9100 or the tripod 9000 is moved unless the adjustment work is carried out very carefully.

Recently, the measuring accuracy of the surveying instrument 9100 has remarkably improved, and the surveying instrument 9100 is capable of highly accurate survey. If a surveying instrument capable of measuring horizontal angles and elevation angles in an accuracy of about 5" is dislocated from a plumb position by 5 mm, an error of about 10" per 100 m is introduced in the measurement of the surveying instrument. Therefore the plumbing work requires highly accurate work of a skilled surveyor. Accordingly, there has been an ardent desire for a means capable of enabling persons other than skilled persons to achieve the highly accurately measurement of the instrument height H.

SUMMARY OF THE INVENTION

Accordingly, it is an object of the present invention to provide a plumbing device for plumbing a surveying instrument capable of calculating dislocations x and y of the surveying instrument from a datum point, and the instrument height H of the surveying instrument.

According to one aspect of the present invention, a plumbing device for plumbing a surveying instrument, capable of calculating the instrument height H of the surveying instrument comprises optical means for forming an image of a target placed at a survey station to indicate the station; photodetecting means for receiving an image of the target and providing an image signal, and processing means for calculating instrument height corresponding to the distance between a reference point on the surveying instrument and the target and dislocation from the station.

DESCRIPTION OF THE PREFERRED EMBODIMENTS

Figure 1:
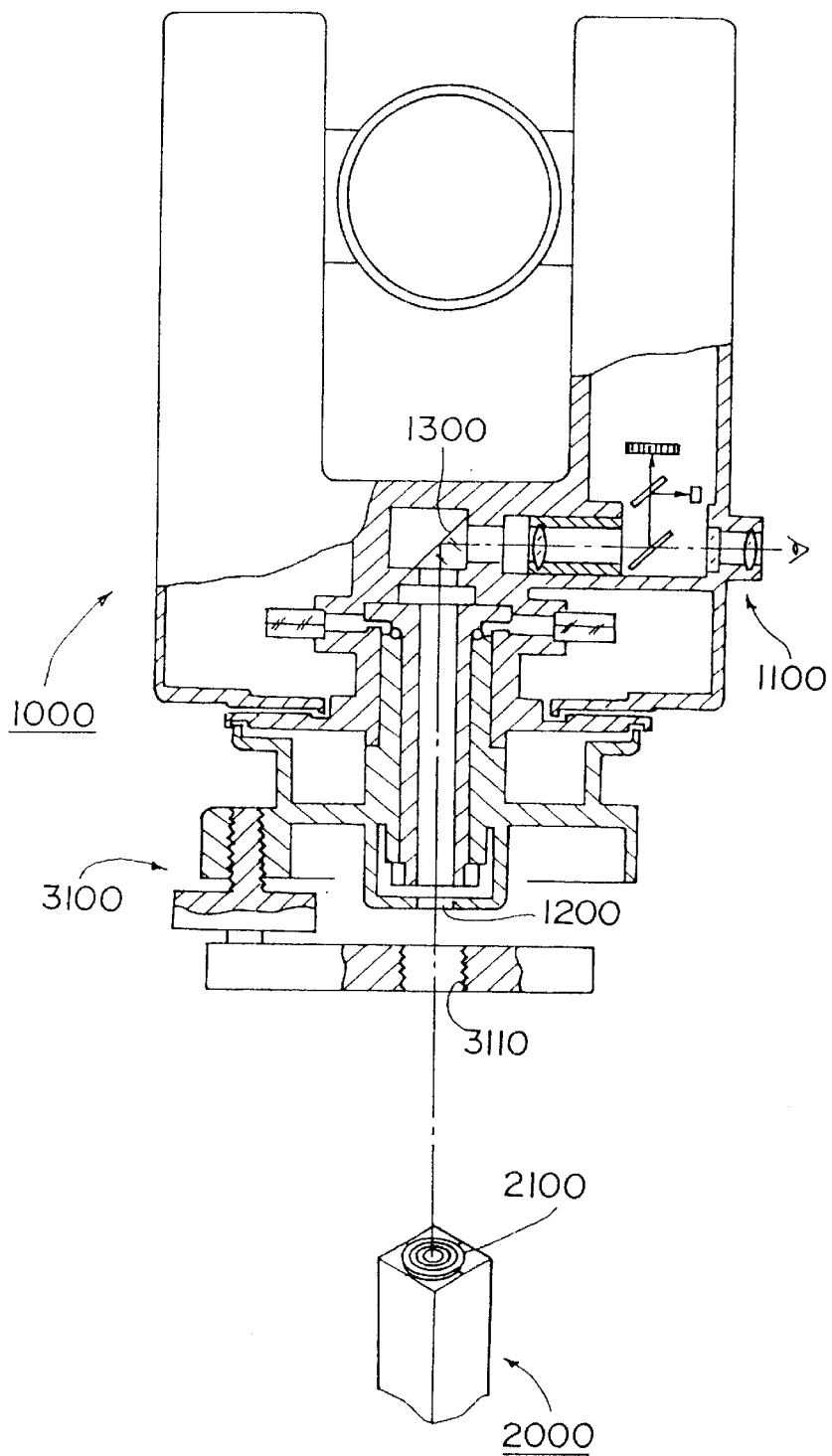
FIG. 1 is a sectional view of a surveying instrument in a preferred embodiment according to the present invention.

Shown in FIG. 1 are a surveying instrument 1000 and a station marker 2000. The surveying instrument 1000 is provided with a plumbing telescope 1100. An instrument height measuring target 2100 for measuring instrument height is formed on the station marker 2000 with its center coincided with the center axis of the station marker 2000. FIG. 1 shows the surveying instrument 1000 after the completion of a leveling operation and before a plumbing operation using the plumbing telescope 1100.

A hole 1200 for the passage of a collimation light beam is formed in a central part of the bottom of the surveying instrument 1000. A reflecting prism 1300 for perpendicularly deflecting the collimation light beam is disposed on the vertical rotation axis of the surveying instrument 1000. A leveling base 3100 is provided with a threaded hole 3110 for use in fastening the leveling base 3100 to a tripod 3000. The threaded hole 3110 can be seen through the hole 1200 of the surveying instrument 1000.

The collimation light beam traveled through the hole 1200 is reflected by the reflecting prism 1300 toward the plumbing telescope 1100. The plumbing telescope 1100 separates the collimating light beam from a measuring light beam.

Figure 2:
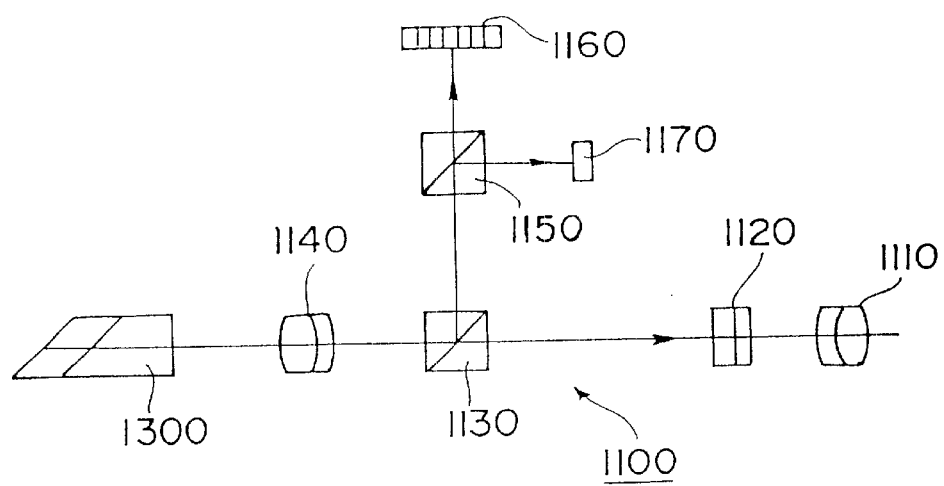
FIG. 2 is a diagrammatic view of an optical system included in a plumbing telescope.

The optical construction of the plumbing telescope 1100 will be described with reference to FIG. 2. The plumbing telescope 1100 comprises an eyepiece 1110, a reticle 1120, a first beam splitter 1130, an objective lens 1140, a second beam splitter 1150, a first CCD 1160 and a second CCD 1170.

Light reflected by the reflecting prism 1300 is focused by the objective lens 1140 to form an image of the instrument height measuring target 2100 (hereinafter referred to simply as "target image") on the reticle 1120 provided with cross hairs. The objective lens 1140 and the reticle 1120 correspond to the optical means. The surveyor views the target image formed on the reticle 1120 through the eyepiece.

The first beam splitter 1130 is interposed between the objective lens 1140 and the reticle 1120 to transmit part of the collimation light beam toward the reticle 1120 and to reflect the rest, i.e., a measuring light beam, perpendicularly toward the second beam splitter 1150. The second beam splitter 1150 splits the measuring light beam into a first measuring light beam and a second measuring light beam. Part of the measuring light beam reflected by the first beam splitter 1130 travels through the second beam splitter 1150 as the first measuring light beam, and the rest of the same is reflected at a deflection angle of 90° to form the second measuring light beam. The first measuring light beam falls on the first CCD 1160, i.e., a first photodetecting means. The second measuring light beam falls on the second CCD 1170, i.e., a second photodetecting means. The first CCD 1160 and the second CCD 1170 are positionally conjugate with the reticle 1120 with respect to the first beam splitter 1130.

Figure 3:
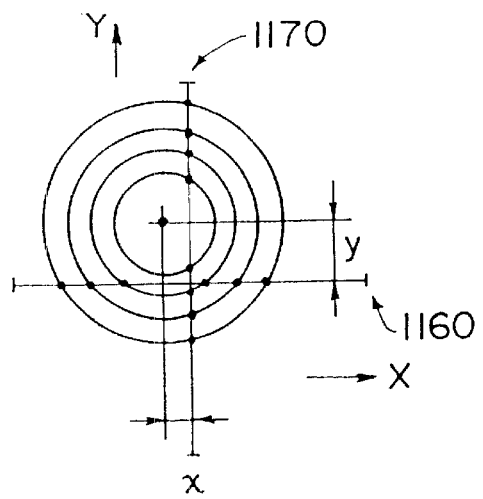
FIG. 3 is a diagrammatic view of assistance in explaining a principle on which the surveying instrument shown in FIG. 1 is based.

A principle of measurement of instrument height H will be described hereinafter. The instrument height measuring target 2100 consists of concentric circles as shown in FIG. 1. FIG. 3 shows the target image formed on the reticle 1120.

The first CCD 1160 and the second CCD 1170 are disposed with their light receiving surfaces extended perpendicularly to each other. Therefore, the first CCD 1160 is able to measure a position of the target image on the X-axis (FIG. 3), and the second CCD 1170 is able to measure a position of the target image on the Y-axis (FIG. 3). FIG. 3 shows the relation between the target image formed on the reticle 1120, and the first CCD 1160 and the second CCD 1170.

A dislocation of the reference point from the datum point along the X-axis is represented by x, and a dislocation of the reference point from the datum point along the Y-axis is represented by y. The dislocation x is equal to the distance between a 0 point on the X-axis and the middle point of one of intervals between adjacent intersections of the X-axis and the concentric circles different from the other intervals. Similarly, the dislocation y is equal to the distance between a 0 point on the Y-axis and the middle point of one of intervals between adjacent intersections of the Y-axis and the concentric circles different from the other intervals. The dislocations x and y are calculated by a proper processing means. The radius of specified one of the circular images forming the target image can be calculated by applying the dislocation x or y, and a value equal to half the different interval to the theorem of three squares.

Since the circumferences of the circular images are known, the diameters of circular images crossing the first CCD 1160 or the second CCD 1170 can be calculated by measuring the number of intersections of the X-axis or the Y-axis, and the circular images, and the intervals between the intersections of the X-axis or the Y-axis, and the circular images.

Since the half the distance (½ distance) between the two zero-cross points can readily be measured, the dislocations x and y can be calculated by applying the radius of a specified circular image and the ½ distance to the theorem of three squares.

Since the diameters of the circles forming the instrument height measuring target are known, the instrument height H, i.e. the distance between the reference point and the instrument height measuring target 2100, can simply determined by conversion using the optical magnification of the target image.

Although this embodiment employs the two photodetecting means, i.e., the first and the second CCD, the embodiment may employ a single photodetecting means, and the photodetecting means or the surveying instrument 1000 may be turned through an angle of 90° after measurement from one direction.

Figure 8:
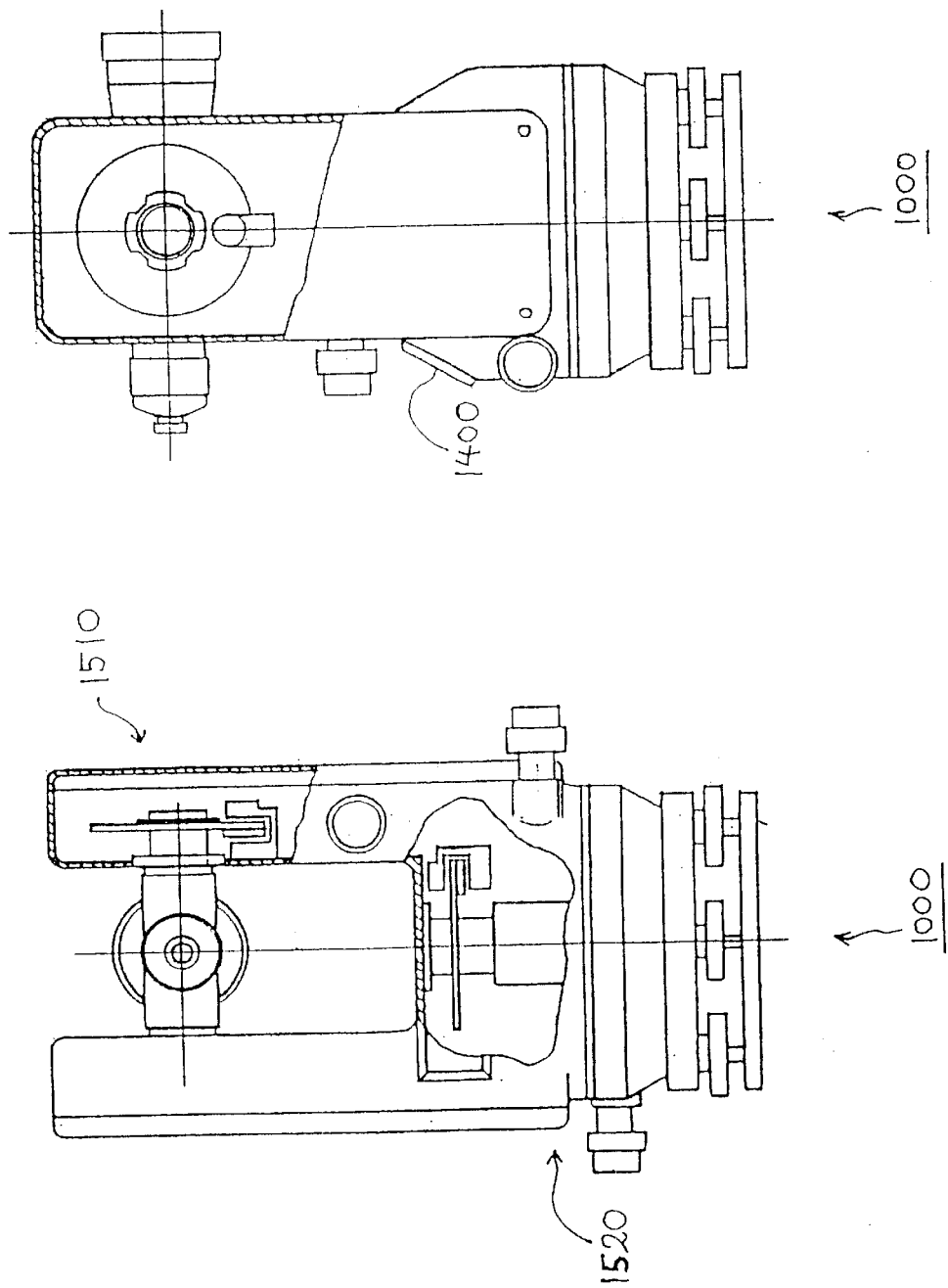
FIG. 8 is a partly cutaway front view of a display unit included in a total station.
Figure 9:
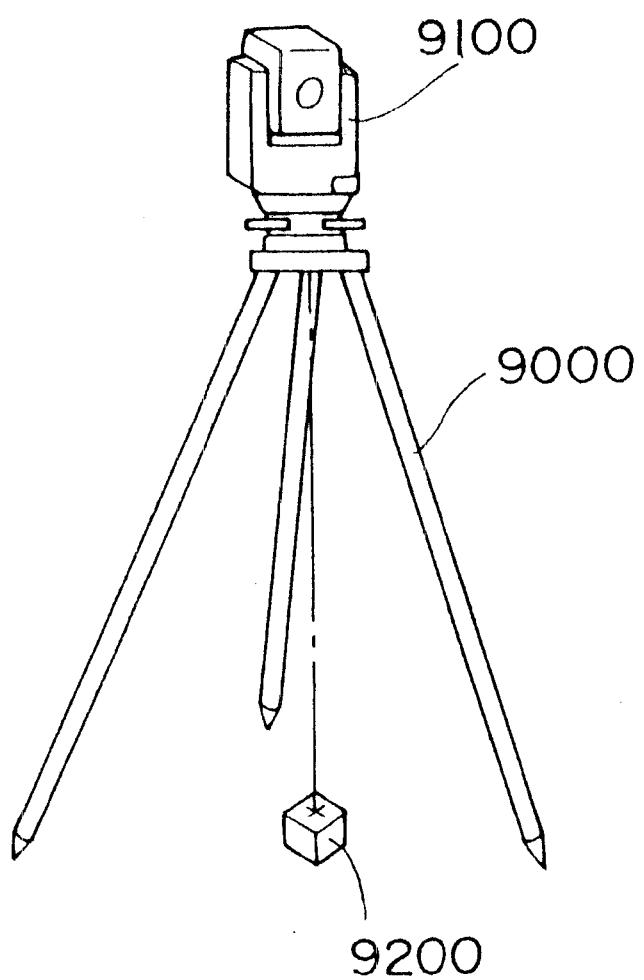
FIG. 9 is a perspective view of a conventional surveying instrument.
Figure 10:
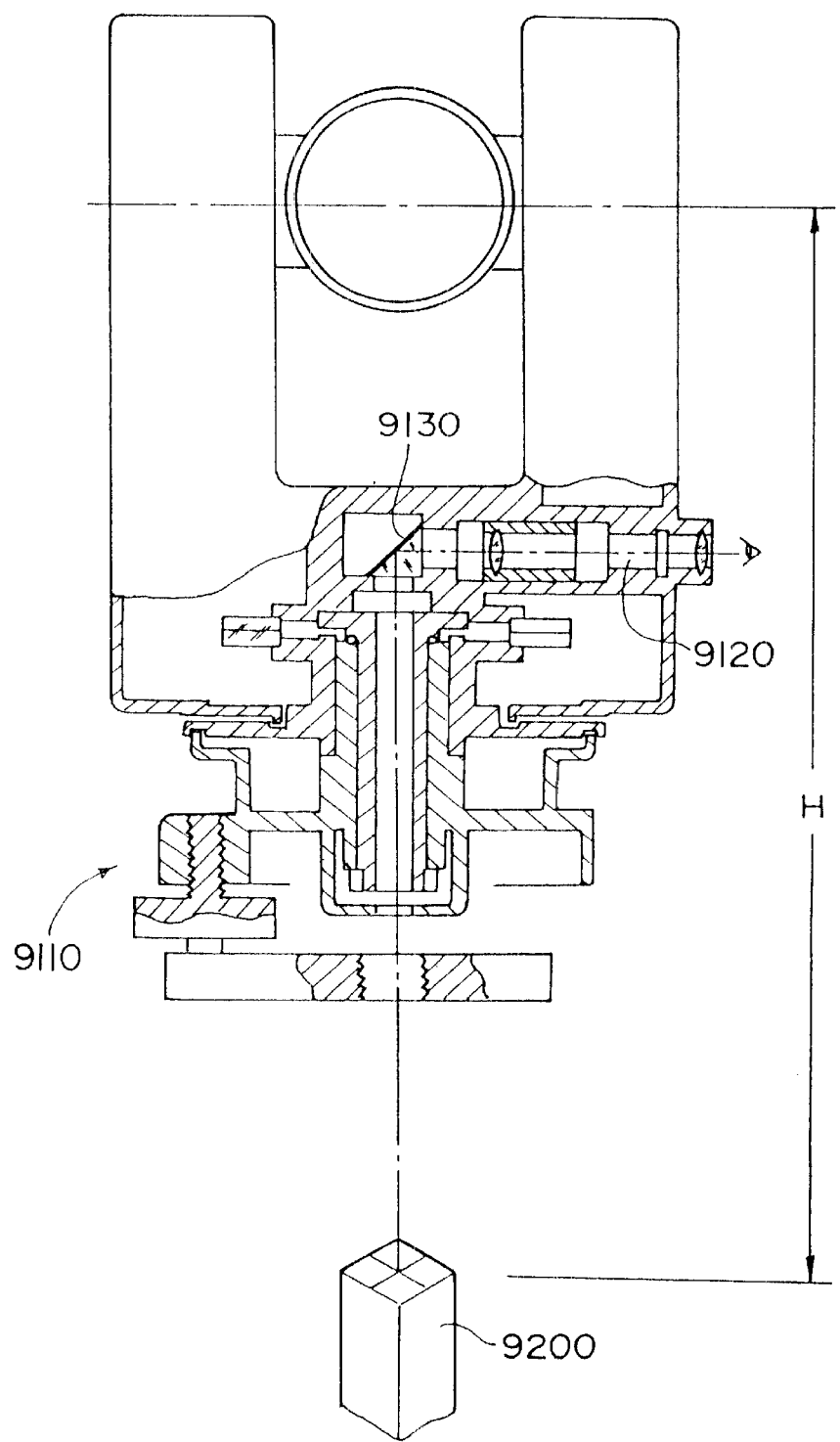
FIG. 10 is a partly sectional front view of the surveying instrument shown in FIG. 9.

The dislocations x and y and the instrument height H thus measured may be displayed on the screen of a display unit 1400 (FIG. 8) included in the surveying instrument 1000.

Figure 4:
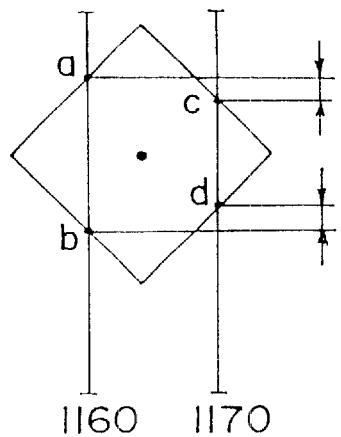
FIG. 4 is a diagrammatic view of assistance in explaining a principle on which the surveying instrument shown in FIG. 1 is based.

The instrument height measuring target 2100 for instrument height measurement is a pattern of concentric circles. The instrument height measuring target 2100 is not limited necessarily to the pattern of concentric circles, but may be a rectangle as shown in FIG. 4. Although the first and the second photodetecting means intersect the center line of the rectangle in FIG. 4, the same can be used when the position between the first and the second photodetecting means is turned.

The dislocation x can be calculated by comparing length between the intersection points a and b of the first CCD and the target image, and the length between the intersection point c and d of the second CCD and the target image. The dislocation y can be calculated on the basis of the positions of the intersections of the first and the second CCD, and the target image.

When turned and tilted, an amount of turning is calculated on the basis of the positions of the intersections of the first and the second CCD, and the target image, and the dislocations can be calculated. The surveying instrument 1000 may be turned for dislocation correction.

Figure 5:
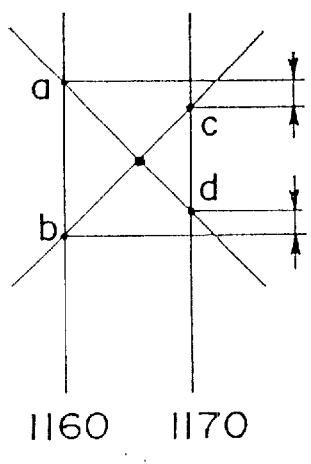
FIG. 5 is a diagrammatic view of assistance in explaining a principle on which the surveying instrument shown in FIG. 1 is based.

Since the dimensions of the rectangular instrument height measuring target are known, the instrument height H, i.e., the distance between the reference point and the instrument height measuring target 2100, can be calculated on the basis of the ratio of light receiving positions on the first and the second CCD. Similarly, an instrument height measuring target as shown in FIG. 5 may be used.

Figure 6:
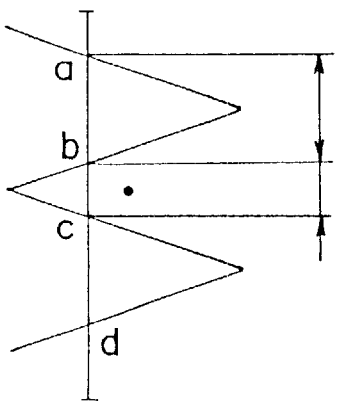
FIG. 6 is a diagrammatic view of assistance in explaining a principle on which the surveying instrument shown in FIG. 1 is based.

FIG. 6 is a view of assistance in explaining a case where a single photodetecting means is used. The photodetecting means is disposed so as to cross a W-shaped target image. When turned, distances between intersection points a and b, intersection points b and c, and intersection points c and d are different. Therefore, dislocation x can be calculated on the basis of the distance between the intersection points a and b and the distance between the intersection points c and d. Similarly, dislocation y can be calculated from a light receiving position.

A total station, i.e., a surveying instrument most prevalently used in recent years, measures horizontal angle and elevation angle electrically, and is provided with a built-in electrooptical distance meter for distance measurement. The total station is provided with a high-mspeed processing means. The processing means receives dislocations of the reference point from the datum point, and instrument height H and is capable of automatically displaying true measured values determined by correction. The total station is provided with a light transmission encoder as an angle measuring means, and is internally provided with a processing means for processing light reception signals provided by the photodetecting means. Therefore, the total station does not need an additional processing means for processing light reception signals provided by the photodetecting means upon the reception of light representing the target image.

Figure 7:
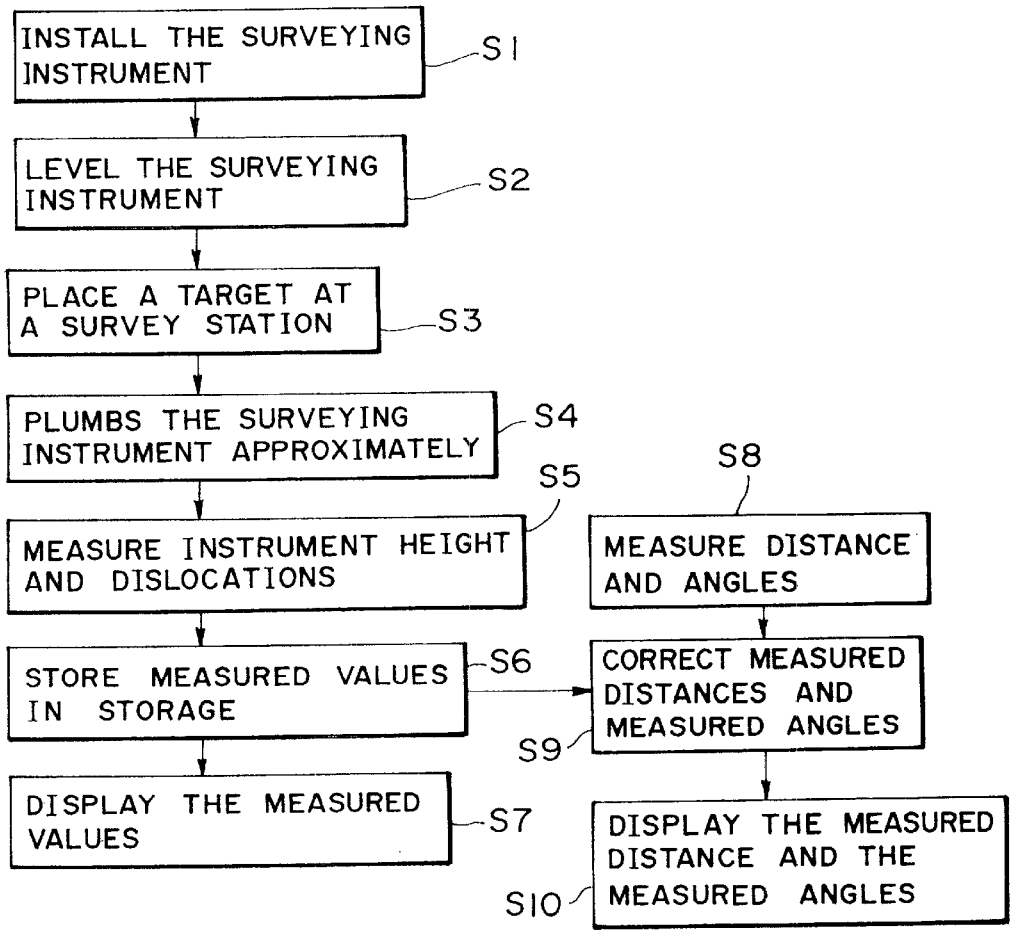
FIG. 7 is a flow chart of a procedure to be carried out by the surveying instrument shown in FIG. 1.

The operation of the surveying instrument 1000 will be described hereinafter with reference to FIG. 7.

The surveying instrument 100 is installed in step S1, and the surveying instrument 1000 is leveled in step S2. The instrument height measuring target 2100 is placed at the datum point in step S3. The surveyor plumbs the surveying instrument 1000 approximately in step S4. In step S5, a dislocation x, a dislocation y and a instrument height H are measured by the procedure mentioned above. Measured values are stored in a storage means included in the surveying instrument 1000 in step S6. The stored measured values are displayed on the screen of the display unit 1400 of the surveying instrument 1000 in step S7.

When the surveying instrument 1000 is a total station, operations for distance and angle measurement are carried out in step S8. Corrections for correcting distances and angles measured in step S8 are calculated by using the measured values (dislocation x, dislocation y and instrument height H) stored in the storage means in step S6. The corrections calculated in step S9 are displayed on the screen of the display unit 1400 in step S10.

The distance measuring operation to be carried out in step S8 may use an electrooptical distance meter. The angle measuring operation to be carried out in step S8 may use an elevation angle encoder 1510 (FIG. 8) for elevation angle measurement and a horizontal angle encoder 1520 for horizontal angle measurement. If a laser plumbing device capable of indicating the plumb position with a laser beam, the position may approximately be adjusted. Accordingly, the efficiency of the survey work can be improved.

As is apparent from the foregoing description, according to the present invention, an image of the target placed at a survey station is formed to indicate the survey station, the photodetecting means receives an image of the target and provides an image signal, and the processing means calculates an instrument height corresponding to the distance between the reference point on the surveying instrument and the target and dislocations from the station. Thus, the instrument height and the dislocations can automatically be measured in high accuracies without requiring any skilled hand.

According to the present invention, in a surveying instrument capable of electrically measuring at least horizontal angle and elevation angle, a plumbing device for plumbing a surveying instrument, the optical means forms an image of a target placed at a survey station to indicate the survey station, the photodetecting means receives an image of the target and provides an image signal, the processing means calculates instrument height corresponding to the distance between the reference point on the surveying instrument and the target and dislocations from the survey station, and the processing means corrects horizontal angle and elevation angle or corrects distance. Accordingly, the efficiency of surveying work can be improved and accurate survey can be achieved.

What is claimed is:

1. A plumbing device for plumbing a surveying instrument, comprising:

a target for placing at a survey station to indicate the survey station and the target providing a pattern, the target being marked with a predetenmined pattern indicating the surveying station;

optical means for forming an image of the pattern;

image sensing means for receiving at least one linear image of the pattern, the image sensing means including a first linear light-receiving means and a second linear light-receiving means arranged perpendicular to each other such that said first light-receiving means provides image signals indicative of the pattern along an x-axis and said second light-receiving means provides image signals indicative of the pattern along a y-axis perpendicular to the x-axis; and processing means for calculating instrument height corresponding to distance between the surveying instrument and the target based on the image of the pattern received by the image sensing means.

2. The plumbing device according to claim 1, wherein the target pattern is concentric circles, wherein the light receiving means detect intersection points of the image of the pattern and said X axis and Y axis, and wherein the processing means calculates image diameters of circular images of said concentric circles and calculates an instrument height corresponding to the image diameters.

3. A plumbing device for plumbing a surveying instrument, comprising:

a target for placing at a survey station to indicate the survey station, the target providing a pattern, and the target being marked with a predetermined pattern indicating the surveying station;

optical means for forming an image of the pattern;

image sensing means for receiving at least one linear image of the pattern, the image sensing means including first linear light-receiving means and second linear light-receiving means arranged perpendicular to each other such that said first light-receiving means provides image signals indicative of the pattern along an x-axis and said second light-receiving means provides image signals indicative of the pattern along a y-axis perpendicular to the x-axis; and processing means for calculating dislocations of the surveying instrument from the survey station based on the image of the pattern received by the image sensing means.

4. The plumbing device according to claim 3, wherein the target pattern in concentric circles, wherein the light receiving means detect intersection points of the image of the pattern and said X axis and Y axis, and wherein the processing means calculates image diameters of images of said concentric circles in said X axis direction and Y axis direction.

5. A surveying instrument capable of electrically measuring at least horizontal angle and elevation angle comprising:

a target providing a pattern;

optical means for forming an image of the pattern;

first and second linear image sensing means disposed perpendicular to each other for receiving linear images of the pattern;

processing means for calculating dislocations of the surveying instrument from the survey station based on the images of the pattern by the image sensing means; and the processing means calculates corrections to said horizontal angle and said elevation angle based on said dislocations.

6. A surveying instrument capable of electrically measuring distance comprising:

a target for placing at a survey station to indicate the survey station, and the target providing a pattern;

optical means for forming an image of the pattern;

first and second linear image sensing means disposed perpendicular to each other for receiving linear images of the pattern;

processing means for calculating dislocations of the surveying instrument from the survey station based on images of the pattern by the image sensing means and;

wherein the processing means calculates corrections to said distance based on said dislocations.

* * * * *

UNITED STATES PATENT AND TRADEMARK OFFICE
CERTIFICATE OF CORRECTION

PATENT NO.     : 6,453,569 B1
DATED          : September 24, 2002
INVENTOR(S)    : Kumagai et al.

It is certified that error appears in the above-identified patent and that said Letters Patent is hereby corrected as shown below:

<u>Title page,</u>
Item [54], Title, "SURVEYING INSTRUMENT AND PLUMBING DEVICE FOR PLUMBING SURVEYING INSTRUMENT" should read -- INCLINATION MEASURING APPARATUS --

<u>Column 2,</u>
Line 4, "extend" should read -- extends --

<u>Column 3,</u>
Line 26, "traveled" should read -- traveling --

<u>Column 5,</u>
Line 27, "high-mspeed" should read -- high-speed --
Line 66, "If" should read -- In --

<u>Column 6,</u>
Line 32, "station and the" should read -- station, the --
Line 33, "predetenmined" should read -- predetermined --
Line 51, "detect" should read -- detects --
Line 52, "X axis" should read -- x-axis --; and "Y axis" should read -- y-axis --
Line 59, "station, the" should read -- station, and the --; and "and" should be deleted <u>Column 7,</u>
Line 11, "in" should read -- is --
Line 12, "detect" should read -- detects --
Lines 13 and 15, "X axis" should read -- x-axis --; and "Y axis" should read -- y-axis --

UNITED STATES PATENT AND TRADEMARK OFFICE
CERTIFICATE OF CORRECTION

PATENT NO. : 6,453,569 B1
DATED : September 24, 2002
INVENTOR(S) : Kumagai et al.

It is certified that error appears in the above-identified patent and that said Letters Patent is hereby corrected as shown below:

<u>Column 8,</u>
Line 11, "and" should be deleted
Line 16, "pattern;" should read -- pattern; and --
Line 19, "means and;" should read -- means, --

Signed and Sealed this

Twenty-fourth Day of June, 2003

JAMES E. ROGAN
*Director of the United States Patent and Trademark Office*